(12) United States Patent  
Lee

(10) Patent No.: US 8,578,123 B2  
(45) Date of Patent: *Nov. 5, 2013

(54) DEFRAGMENTATION METHOD FOR A MACHINE-READABLE STORAGE DEVICE

(75) Inventor: Yu-Hsuan Lee, Taipei Hsien (TW)

(73) Assignee: Apacer Technology Inc., Hsichih, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,620

(22) Filed: Aug. 31, 2012

(65) Prior Publication Data

US 2012/0331214 A1 Dec. 27, 2012

Related U.S. Application Data

(63) Continuation of application No. 12/630,392, filed on Dec. 3, 2009, now Pat. No. 8,285,962.

(30) Foreign Application Priority Data

Dec. 8, 2008 (TW) ................. 97147634 A

(51) Int. Cl.  
*G06F 12/00* (2006.01)

(52) U.S. Cl.  
USPC .................................................. 711/170

(58) Field of Classification Search  
None  
See application file for complete search history.

(56) References Cited

U.S. PATENT DOCUMENTS

| | | | |
|---|---|---|---|
| 5,630,093 A | 5/1997 | Holzhammer et al. | |
| 5,832,525 A | 11/1998 | Wong et al. | |
| 5,930,828 A | 7/1999 | Jensen et al. | |
| 6,571,261 B1 | 5/2003 | Wang-Knop et al. | |
| 8,051,115 B2 | 11/2011 | Biller | |
| 8,140,804 B1 | 3/2012 | Sobel et al. | |
| 8,285,962 B2 * | 10/2012 | Lee ............................ | 711/170 |
| 2006/0149899 A1 | 7/2006 | Zimmer et al. | |

FOREIGN PATENT DOCUMENTS

| | | |
|---|---|---|
| TW | 200846911 | 4/2008 |
| TW | 477932 | 1/2011 |

OTHER PUBLICATIONS

Roy Kung, To Improve Your Storage Operation Performance SSD±Optizmer, APACER Technology, Inc., Sep. 30, 2008, http://www.digitimes.com.tw/tw/B2B/Seminar/Service/download/0529709230/Apacer_970923-03.pdf, Figs. 4, 5, 9-13; pp. 1-16, 9 pages.

Diskeeper, User Manual for Diskeeper for Windows, Oct. 2007, Diskeeper Corporation, http://downloads.condusiv.com/pdf/Diskeeper2008-UserManual.pdf, pp. 8, 10, 13, 14, 18, 23-28, 46 pages.

English Translation of Search Report of Taiwanese Patent Application No. 097147634, Dated Nov. 12, 2012.

* cited by examiner

*Primary Examiner* — Hiep Nguyen  
(74) *Attorney, Agent, or Firm* — Hunton & Williams LLP

(57) ABSTRACT

A defragmentation method includes the steps of: a) configuring a processor to determine a type of a target machine-readable storage device coupled electrically to the processor; b) configuring the processor to select, from among a plurality of pre-established defragmentation algorithms respectively for performing defragmentation on different types of machine-readable storage devices, a defragmentation algorithm that corresponds to the type of the target machine-readable storage device as determined in step a); and c) configuring the processor to perform defragmentation on the target machine-readable storage device according to the defragmentation algorithm as selected in step b).

22 Claims, 2 Drawing Sheets

DEFRAGMENTATION METHOD FOR A MACHINE-READABLE STORAGE DEVICE

This patent application is a Continuation of U.S. patent application Ser. No. 12/630,392, filed Dec. 3, 2009 entitled now U.S. Pat. No. 8,285,962 "DEFRAGMENTATION METHOD FOR A MACHINE-READABLE STORAGE DEVICE", the disclosure of which is hereby incorporated by reference in its entirety.

CROSS-REFERENCE TO RELATED APPLICATION

This application claims priority of Taiwanese Application No. 097147634, filed on Dec. 8, 2008.

BACKGROUND OF THE INVENTION

1. Field of the Invention

The invention relates to a method for managing memory, more particularly to a defragmentation method for a machine-readable storage device.

2. Description of the Related Art

After a hard disk of a computer has been used for a period of time, the number of accesses to files stored in the hard disk has increased such that it is less likely to store files in a contiguous memory space in the hard disk. In other words, it is less likely to store files in contiguous memory cells in the hard disk. As a result, a single file is divided into pieces that are respectively stored in a plurality of segments of memory cells (also known as "file segments") scattered in the hard disk. Consequently, when the file is to be accessed, it is required for a read-write head of the hard disk to look into different locations in the hard disk. This degrades data access efficiency of the hard disk, and also wears out the read-writing head.

In order to solve the aforementioned problem, there are currently a plurality of defragmentation software that employ different algorithms to conduct defragmentation on hard disks, in which file fragments are rearranged such that pieces of the same file are stored in contiguous memory cells to the best possible, and such that empty memory cells (also known as "free space fragments") are gathered together in a contiguous manner.

With the advancement of semiconductor manufacturing technology, flash memories are made into solid-state drives (SSDs) that have large storage capacities to replace conventional hard disks (HDs). The same problem of having file fragments and free space fragments also exists in solid-state drives. However, in view of the fact that a flash memory can only be accessed a certain number of times during its service life, the service life of a SSD may be significantly and adversely reduced if the defragmentation algorithms for hard disks are used for defragmentation. Due to this constraint, current defragmentation software is directed for defragmentation on only hard disks or only solid-state drives, and cannot be used for defragmentation on both hard disks and solid-state drives without adverse effects.

SUMMARY OF THE INVENTION

Therefore, the object of the present invention is to provide a defragmentation method for a machine-readable storage device that uses different defragmentation algorithms for different types of machine-readable storage devices so as to achieve the effect of improving data access efficiency of the machine-readable storage devices, while minimizing adverse effects on service lives of the machine-readable storage devices.

Accordingly, there is provided a defragmentation method that includes the steps of: a) configuring a processor to determine a type of a target machine-readable storage device coupled electrically to the processor; b) configuring the processor to select, from among a plurality of pre-established defragmentation algorithms respectively for performing defragmentation on different types of machine-readable storage devices, a defragmentation algorithm that corresponds to the type of the target machine-readable storage device as determined in step a); and c) configuring the processor to perform defragmentation on the target machine-readable storage device according to the defragmentation algorithm as selected in step b). The present invention also provides a computer program product, comprising a data storage medium that includes program instructions to be executed by a computing device so as to enable the computing device to execute steps of the abovementioned defragmentation method. Moreover, the present invention further provides a computing device including a memory module for storing the pre-established defragmentation algorithms, and a lookup table indicating the corresponding relationships between the defragmentation algorithms and the different types of machine-readable storage devices, and a processor configured to perform the abovementioned defragmentation method. The processor may begin performing the defragmentation method of the present invention automatically or on demand by the user. The different types of machine-readable storage devices may include a hard disk, a single-level cell (SLC) type flash memory, a multi-level cell (MLC) type flash memory, and a triple-level cell (TLC) type flash memory, but are not limited to those disclosed herein.

In addition, the type of the target machine-readable storage device can be determined with reference to at least one of an identification code, a storage capacity, an access speed, and a connection interface of the target machine-readable storage device.

The defragmentation algorithm corresponding to a hard disk allows for defragmentation on all storage cells in a hard disk. The defragmentation algorithm corresponding to a flash memory is one that minimizes a number of memory cell accesses to a flash memory during defragmentation.

Preferably, the defragmentation algorithm corresponding to a flash memory allows for defragmentation of each file in the flash memory with a total number of file fragments that exceeds a predefined fragment number, or of each fragment in the flash memory having a total number of bytes that exceeds a predefined byte number, or of each file in the flash memory whose file type matches a predefined file type. In one embodiment, the defragmentation algorithm corresponding to a flash memory is performed only if the target machine-readable storage device has a storage capacity that is greater than a predefined capacity.

According to another aspect of the present invention, there is provided a defragmentation method that includes the steps of: a) configuring a processor to determine whether a file in a target machine-readable storage device that is coupled electrically to the processor satisfies a defragmentation condition; and b) upon determining that the defragmentation condition is satisfied in step a), configuring the processor to perform defragmentation of the file in the target machine-readable storage device. Preferably, the defragmentation condition is satisfied if a number of file fragments corresponding to the file is greater than a predefined fragment number, or if at least one file fragment corresponding to the file has a number of bytes that is not greater than a predefined byte number, or if the file has a file type that matches a predefined file type, or if the file is stored under a predefined access path. The present invention also provides a computer program product, comprising a data storage medium that includes program instructions to be executed by a computing device so as to enable the computing device to execute steps of the abovementioned defragmentation method.

According to yet another aspect of the present invention, there is provided a defragmentation method, that includes the steps of: a) configuring a processor to determine whether a target machine-readable storage device coupled electrically to the processor satisfies a defragmentation condition; and b) upon determining that the defragmentation condition is satisfied in step a), configuring the processor to perform defragmentation on the target machine-readable storage device; wherein, in step a), the defragmentation condition is satisfied when one of the following is met: the target machine-readable storage device has a capacity that is greater than a predefined capacity, and the target machine-readable storage device has at least one free space fragment having a total number of bytes that is not greater than a predefined byte number; and wherein, in step b), defragmentation is performed on the at least one free space fragment of the target machine-readable storage device when the target machine-readable storage device has at least one free space fragment having a total number of bytes that is not greater than the predefined byte number. The present invention also provides a computer program product, comprising a data storage medium that includes program instructions to be executed by a computing device so as to enable the computing device to execute steps of the abovementioned defragmentation method.

In the present invention, a defragmentation algorithm suitable for a target machine-readable storage device is determined prior to performing defragmentation on the target machine-readable storage device to enhance data access efficiency of the target machine-readable storage device, while simultaneously ensuring that adverse effect on the service lifetime of the target machine-readable storage device as a result of the defragmentation operation is kept to a minimum.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
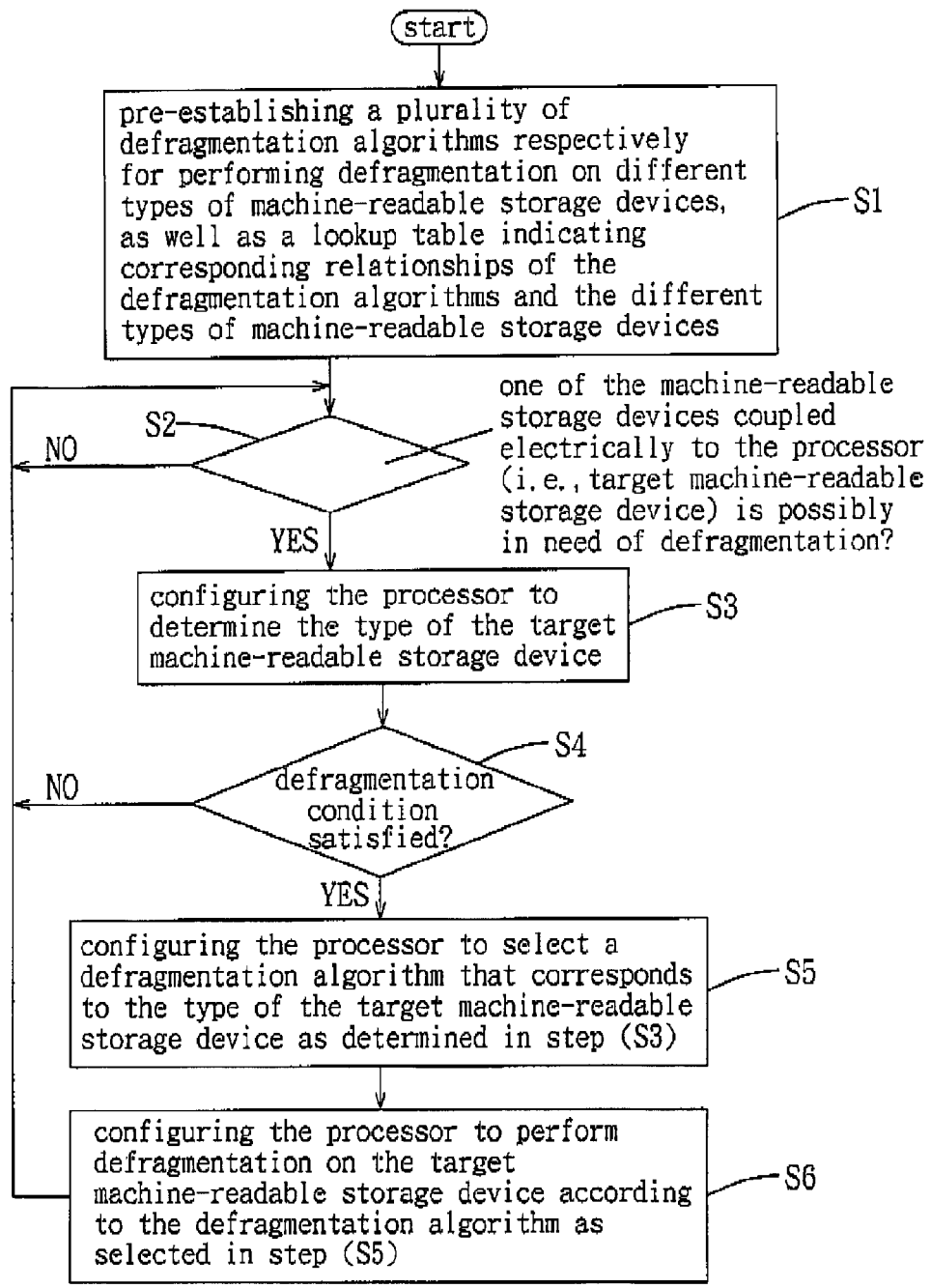
FIG. 1 is a flowchart chart of the defragmentation method for a machine-readable storage device according to the preferred embodiment of the present invention.
Figure 2:
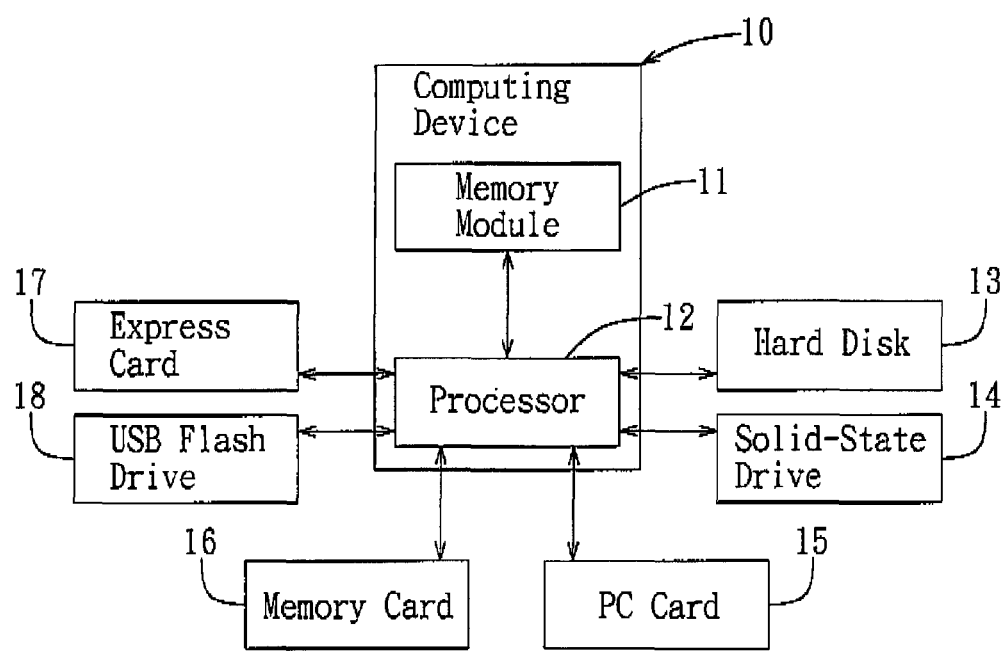
FIG. 2 is a block diagram, illustrating a computing device according to the preferred embodiment, and a plurality of machine-readable storage devices coupled electrically to the computing device.

Referring to FIG. 1 and FIG. 2, a defragmentation method for a machine-readable storage device according to the preferred embodiment of the present invention is shown and may be realized through a computer program product (not shown) that includes a data storage medium which includes program instructions to be executed by a computing device 10 so as to enable the computing device 10 to execute steps of the defragmentation method. The program instructions may be loaded into a memory module 11 of the computing device 10 prior to performing the defragmentation method. The computing device 10 further includes a processor 12 coupled electrically to the memory module 11.

Apart from using a hard disk 13 and/or a solid-state drive 14 as primary data storage devices, for convenience of data portability and memory capacity expansion, the computing device 10 is also equipped with multiple connection interfaces (not shown), such as a USB slot, a PCMCIA slot, a PCIE slot, a Cr slot, an SD slot, an XD slot, an MS slot, etc., for connection to various machine-readable storage devices, such as a PC card 15, a memory card 16 (e.g., a SD card or a CF card), an Express card 17, a USB flash drive 18, etc. The hard disk 13, the solid-state drive 14, the PC card 15, the memory card 16, the Express card 17, and the USB flash drive 18 are hereinafter collectively referred to as "the machine-readable storage devices" 13~18, and are all coupled electrically to the processor 12.

Regardless of the type of the machine-readable storage device 13~18, after being used for a period of time, it is likely that the files in the machine-readable storage device 13~18 are stored in fragments, and that the available space in the machine-readable storage device 13~18 is also fragmented, i.e., it is likely that the machine-readable storage device 13~18 has file fragments and free space fragments. This degrades data access efficiency of the machine-readable storage device 13~18, and the operating efficiency of the computing device 10 is also adversely affected. It is therefore necessary to perform defragmentation on the machine-readable storage devices 13~18 that are coupled electrically to the computing device 10 at suitable times in order to rearrange the locations of the files and empty spaces therein so as to improve the efficiencies of both the machine-readable storage devices 13~18 and the computing device 10.

However, different types of machine-readable storage devices 13~18 have varying characteristics. For instance, there is generally no limit on the total number of times of accesses for the hard disk 13, but a flash memory can only have a limited number of memory accesses over the service life thereof. If the solid-state drive 14 or the memory card 16 adopt single-level cell (SLC) type flash memories, then the service life thereof is dependent upon the limit of approximately 100K times of memory cell accesses to the single-level cells, whereas if the solid-state drive 14 or the memory card 16 adopt multi-level cell (MLC) type flash memories, then the service life thereof is dependent upon the limit of approximately 10K times of memory cell accesses to the multi-level cells.

Since re-locating data requires a large number of data accesses to the memory cells of a flash memory, and the service life of the flash memory depends on the number of memory cell access, the defragmentation algorithm for a flash memory must take into consideration the service life thereof in order to minimize the number of times of memory cell accesses to the flash memory. On the other hand, since there is generally no limitation on the number of times of data accesses to the hard disk 13, there is no need for the defragmentation method for a hard disk to be concerned about the number of times of data accesses. As such, the conventional defragmentation method for a hard disk is not suitable for a flash memory.

Therefore, the object of the present invention is to provide a defragmentation method that is capable of performing defragmentation on different types of machine-readable storage devices using different defragmentation algorithms suitable for the types of machine-readable storage devices so as to achieve the effect of improving data access efficiency of the machine-readable storage devices, while minimizing adverse effects on service lives of the machine-readable storage devices.

Therefore, for realization of the object of the present invention, the defragmentation method to be executed by the computing device 10 according to the preferred embodiment is described with reference to FIG. 1 and FIG. 2 as follows.

First, in step (S1), a plurality of defragmentation algorithms respectively for performing defragmentation on different types of machine-readable storage devices, as well as a lookup table indicating corresponding relationships of the defragmentation algorithms and the different types of machine-readable storage devices are pre-established in the memory module 11 of the computing device 10. The defragmentation algorithms may include a hard disk defragmentation algorithm, a SLC type flash memory defragmentation algorithm, a MLS type flash memory defragmentation algorithm, a triple-level cell (TLC) type flash memory defragmentation algorithm, etc. It should be noted herein that the pre-established defragmentation algorithms are not limited to those disclosed herein.

Second, in step (S2), the processor 12 of the computing device 10 is configured to determine whether one of the machine-readable storage devices 13~18 coupled electrically to the processor 12 is possibly in need of defragmentation based on fragment rate (or a total number of fragments) in the machine-readable storage devices 13~18. In particular, if it is determined that one of the machine-readable storage devices 13~18 has a fragment rate exceeding a predefined fragment rate (or a total number of fragments exceeding a predefined fragment total), then said one of the machine-readable storage devices 13~18 is referred to as "a target machine-readable storage device" hereinafter, and the flow goes to step (S3). Otherwise, the flow goes back to step (S2).

Subsequently, in step (S3), the processor 12 of the computing device 10 is configured to determine the type of the target machine-readable storage device. Generally speaking, the storage capacity of a hard disk is greater than that of a solid-state drive, which is normally greater than that of a memory card. In addition, the access speed of a hard disk is generally slower than that of a MLC type flash memory, which is normally slower than that of a SLC type flash memory. Moreover, a hard disk is normally coupled to the computing device 10 via the SATA connection interface, a USB flash drive is normally coupled to the computing device 10 via the USB connection interface, while a memory card is generally coupled to the computing device 10 via the one of PCI, PCIe, CF, SD, and XD connection interfaces. Therefore, in this embodiment, the type of the target machine-readable storage device is determined with reference to at least one of an identification code, a storage capacity, an access speed, and a connection interface of the target machine-readable storage device.

Next, in step (S4), the processor 12 is configured to determine whether the target machine-readable storage device satisfies a defragmentation condition. In this embodiment, different types of machine-readable storage devices correspond to different defragmentation conditions. This will be described in detail later.

Upon determining that the defragmentation condition is satisfied in step (S4), the flow goes to step (S5), where the processor 12 is configured to select, from among the plurality of pre-established defragmentation algorithms in the memory module 11, a defragmentation algorithm that corresponds to the type of the target machine-readable storage device as determined in step (S3) with reference to the lookup table in the memory module 11.

Subsequently, in step (S6), the processor 12 is configured to perform defragmentation on the target machine-readable storage device according to the defragmentation algorithm as selected in step (S5). The flow goes back to step (S2) after step (S6) is completed to determine if another machine-readable storage device 13~18 coupled electrically to the processor 12 is possibly in need of defragmentation.

The defragmentation condition and the defragmentation algorithm corresponding to the different types of machine-readable storage devices 13~18 will be described hereinafter.

When it is determined by the processor 12 that the type of the target machine-readable storage device is a flash memory type (including all of the machine-readable storage devices that adopt the flash memory technology, such as the solid-state drive 14, the PC card 15, the memory card 16, the express card 17, and the USB flash drive 18), the defragmentation algorithm is one that minimizes a number of memory cell accesses to a flash memory during defragmentation. In addition, the defragmentation condition is satisfied when the target machine-readable storage device has a capacity that is greater than a predefined capacity. For example, for a machine-readable storage device (e.g., a memory card) that has a capacity not greater than, say, 1 GB, since the capacity is considerably small, the data access efficiency thereof is not significantly affected by fragmentation, and thus defragmentation is not necessary. Alternatively, the defragmentation condition for a flash memory may also be satisfied when at least one file in the target machine-readable storage device has a file type that matches a predefined file type, e.g., the document file type (.doc file) or the text file type (.txt file). In that case, in step (S6), the processor 12 is configured to perform defragmentation only of said at least one file in the target machine-readable storage device. In other words, the defragmentation algorithm allows for defragmentation of each file in the target machine-readable storage device whose file type matches the predefined file type. The reason behind this is because files having the predefined file type normally have fewer data than files having other file types. Therefore, less re-location of data is encountered during defragmentation. This is beneficial for the flash memory, which has a relatively short service life due to a limited number of tolerable memory cell accesses. Alternatively, the defragmentation condition may also be satisfied if at least one file in the target machine-readable storage device is stored under a predefined access path, such as C:\ or D:\, and in this case, the processor 12 is configured to perform defragmentation only of said at least one file in the target machine-readable storage device in step (S6). In other words, the defragmentation algorithm allows for defragmentation of each file in the flash memory under the predefined access path.

Specifically, there are different types of flash memories, such as the aforementioned SLC type flash memory, and MLC type flash memory. Due to the different characteristics of these different types of flash memories, the defragmentation condition may vary as well.

When it is determined by the processor 12 that the type of the target machine-readable storage device is a SLC type flash memory, the defragmentation condition is satisfied if a number of free space fragments in the target machine-readable storage device is greater than a predefined fragment number, or if a number of file fragments corresponding to at least one file in the target machine-readable storage device is greater than a predefined fragment number, e.g., 10 fragments. In the latter case, the defragmentation algorithm allows for defragmentation of each file in the flash memory with a total number of file fragments that exceeds the predefined fragment number. In other words, the processor 12 is configured to perform defragmentation of only said at least one file in the target machine-readable storage device instep (S6). When the number of file fragments of a file exceeds the predefined fragment number, this indicates that the file is too fragmented, and efficiency for accessing the file is adversely affected. Thus, improving the efficiency for accessing this kind of files will improve the data access efficiency of the target machine-readable storage device.

When it is determined by the processor 12 that the type of the target machine-readable storage device is a MLC type flash memory, since the service life thereof is dependent upon the limit of approximately 10K times of memory cell accesses to the multi-level cells, which is not greater than that of single-level cells, the defragmentation algorithm for MLC type flash memory has to further minimize the number of memory cell accesses during defragmentation as compared to that for SLC type flash memory. As such, the defragmentation condition is satisfied if the target machine-readable storage device has at least one free space fragment having a total number of bytes that is not greater than a predefined byte number, or if at least one file fragment in the target machine-readable storage device has a number of bytes that is not greater than the predefined byte number, e.g., 20K bytes or 100K bytes.

Correspondingly, for the former case, defragmentation is performed on said at least one space fragment of the target machine-readable storage device, and for the latter case, the corresponding defragmentation algorithm allows for defragmentation of each such fragment in the target machine-readable storage device.

The defragmentation algorithm corresponding to a hard disk allows for defragmentation on all storage cells in the hard disk 13. However, all of the abovementioned defragmentation conditions may be applicable to the hard disk 13 as well during actual implementation.

It should be further noted herein that, aside from performing the defragmentation method automatically upon detecting that one of the machine-readable storage devices 13~18 coupled electrically to the processor 12 of the computing device 10 satisfies the condition of step (S2), i.e., the fragment rate of the one of the machine-readable Storage devices exceeds a predefined fragment rate, the defragmentation method of the present invention may also be designed to configure the processor 12 to display on a display screen (not shown) coupled to the computing device 10 an operation menu, listing all of the machine-readable storage devices 13~18 that are coupled electrically to the processor 12 so as to facilitate a user to select one particular machine-readable storage device for defragmentation according to steps (S4), (S5) and (S6)

Alternatively, the defragmentation method may also involve configuring the processor 12 to provide options available for selection by the user respectively corresponding to conducting defragmentation in "real time", in a "scheduled" manner, or "manually", and/or to further provide options available for selection by the user respectively corresponding to the abovementionad defragmentation conditions for user setup. For instance, if the user selects the "real time" option, as well as a defragmentation condition, which is satisfied when a number of file fragments corresponding to a file in the selected one of the machine-readable storage devices 13~18 is greater than a predefined fragment number, e.g., 20, then, the processor 12 is configured to perform defragmentation on the selected one of the machine-readable storage devices 13~18 according to the suitable one of the defragmentation algorithms as selected in step (S5) once the number of file fragments corresponding to a file in the selected one of the machine-readable storage devices 13~18 is greater than 20. If the user selects the "scheduled" option, a further setup can be made with regard to the scheduled time for performing defragmentation, e.g., 10 am every Monday. If the user selects the "manually" option, the steps (S2) to (S6) of the defragmentation method will only be performed upon receipt of the user's instruction to do so.

Furthermore, it should be noted herein that the defragmentation method of the present invention is also applicable to both volatile and non-volatile machine-readable storage devices. In other words, the defragmentation method of the present invention is not limited to application on hard disks and machine-readable storage devices that adopt the flash memory technology as disclosed in the preferred embodiment.

In summary, the present invention provides a defragmentation method for a machine-readable storage device that provides different defragmentation algorithms for different types of machine-readable storage devices, and that determines the type of a target machine-readable storage device in order to select a suitable one of the defragmentation algorithms for subsequent defragmentation of the target machine-readable storage device so as to achieve the effect of improving data access efficiency of the target machine-readable storage device, while minimizing adverse effects on service life of the target machine-readable storage device.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A defragmentation method, comprising the steps of:
    determining a type of a storage device; and
    selecting, from among a plurality of defragmentation algorithms for performing defragmentation on a plurality of types of storage devices, a defragmentation algorithm that corresponds to the type of the storage device.

2. The defragmentation method of claim 1, further comprising the step of:
    configuring one of the plurality of defragmentation algorithms for performing defragmentation on storage device of one of volatile type, solid-state type, flash memory type, and hard disk type.

3. The defragmentation method of claim 1, further comprising the steps of:
    configuring one of the plurality of defragmentation algorithms for performing defragmentation on storage device of a type having a first limit on the number of access times; and
    configuring another one of the plurality of defragmentation algorithms for performing defragmentation on storage device of a type having a second limit on the number of access times, the second limit being greater than the first limit.

4. The defragmentation method of claim 1, further comprising the steps of:
    configuring one of the plurality of defragmentation algorithms for performing defragmentation on storage device of a type having a shorter service life; and
    configuring another one of the plurality of defragmentation algorithms for performing defragmentation on storage device of a type having a longer service life.

5. The defragmentation method of claim 1, further comprising the steps of:

configuring one of the plurality of defragmentation algorithms for performing defragmentation on storage device of a type having a faster access speed; and configuring another one of the plurality of defragmentation algorithms for performing defragmentation on storage device of a type having a slower access speed.

6. The defragmentation method of claim 1, further comprising the steps of:

configuring one of the plurality of defragmentation algorithms for performing defragmentation on storage device of a type having a greater capacity; and configuring another one of the plurality of defragmentation algorithms for performing defragmentation on storage device of a type having a smaller capacity.

7. The defragmentation method of claim 1, further comprising the steps of:

configuring one of the plurality of defragmentation algorithms for performing defragmentation on storage device of a type having a first interface; and configuring another one of the plurality of defragmentation algorithms for performing defragmentation on storage device of a type having a second interface different from the first interface.

8. The defragmentation method of claim 1, further comprising the steps of:

configuring one of the plurality of defragmentation algorithms for performing defragmentation on storage device of a type having a first identification code; and configuring another one of the plurality of defragmentation algorithms for performing defragmentation on storage device of a type having a second identification code different from the first identification code.

9. The defragmentation method of claim 1, further comprising the step of:

configuring one of the plurality of defragmentation algorithms for performing defragmentation on storage device of a type associated with one of a predefined access speed, a predefined capacity, a predefined interface, and a predefined identification code.

10. The defragmentation method of claim 1, further comprising the step of:

configuring one of the plurality of defragmentation algorithms to minimize the number of access times during defragmentation for performing defragmentation on storage device of a type having a limit on the number of access times.

11. A defragmentation method, comprising the steps of:
determining a type of a storage device; and
selecting, from among a plurality of defragmentation conditions associated with performing defragmentation on a plurality of types of storage devices, a defragmentation condition that corresponds to the type of the storage device.

12. The defragmentation method of claim 11, further comprising the step of:

selecting, from among a plurality of defragmentation algorithms for performing defragmentation on a plurality of types of storage devices, a defragmentation algorithm that corresponds to the type of the storage device.

13. The defragmentation method of claim 11, further comprising the step of:

configuring one of the plurality of defragmentation conditions to be associated with performing defragmentation on storage device of one of volatile type, solid-state type, flash memory type, and hard disk type.

14. The defragmentation method of claim 11, further comprising the steps of:

configuring one of the plurality of defragmentation conditions to be associated with performing defragmentation on storage device of a type having a first limit on the number of access times; and configuring another one of the plurality of defragmentation conditions to be associated with performing defragmentation on storage device of a type having a second limit on the number of access times, the second limit being greater than the first limit.

15. The defragmentation method of claim 11, further comprising the steps of:

configuring one of the plurality of defragmentation conditions to be associated with performing defragmentation on storage device of a type having a shorter service life; and configuring another one of the plurality of defragmentation conditions to be associated with performing defragmentation on storage device of a type having a longer service life.

16. The defragmentation method of claim 11, further comprising the steps of:

configuring one of the plurality of defragmentation conditions to be associated with performing defragmentation on storage device of a type having a faster access speed; and configuring another one of the plurality of defragmentation conditions to be associated with performing defragmentation on storage device of a type having a slower access speed.

17. The defragmentation method of claim 11, further comprising the steps of:

configuring one of the plurality of defragmentation conditions to be associated with performing defragmentation on storage device of a type having a larger capacity; and configuring another one of the plurality of defragmentation conditions to be associated with performing defragmentation on storage device of a type having a smaller capacity.

18. The defragmentation method of claim 11, further comprising the steps of:

configuring one of the plurality of defragmentation conditions to be associated with performing defragmentation on storage device of a type having a first interface; and configuring another one of the plurality of defragmentation conditions to be associated with performing defragmentation on storage device of a type having a second interface.

19. The defragmentation method of claim 11, further comprising the steps of:

configuring one of the plurality of defragmentation conditions to be associated with performing defragmentation on storage device of a type having a first identification code; and configuring another one of the plurality of defragmentation conditions to be associated with performing defragmentation on storage device of a type having a second identification code.

20. The defragmentation method of claim 11, further comprising the step of:

configuring one of the plurality of defragmentation conditions to be associated with performing defragmentation on storage device of a type associated with one of a predefined access speed, a predefined capacity, a predefined interface, and a predefined identification code.

21. A defragmentation method, comprising the steps of:
determining whether a file for defragmentation is stored under a predefined access path in a storage device; and upon determining that the file for defragmentation is stored under the predefined access path in the storage device, performing defragmentation on the file.

22. A defragmentation method, comprising the steps of:

determining whether a file for defragmentation stored in a storage device is of a predefined file type; and upon determining that the file for defragmentation stored in the storage device is of the predefined file type, performing defragmentation on the file.

* * * * *